US010397204B2

(12) United States Patent
Hoshino et al.

(10) Patent No.: US 10,397,204 B2
(45) Date of Patent: *Aug. 27, 2019

(54) RECORDING DATA AND USING THE RECORDED DATA

(71) Applicant: International Business Machines Corporation, Armonk, NY (US)

(72) Inventors: Norihisa Hoshino, Tokyo (JP); Kohichi Kamijoh, Yokohama (JP); Takahiro Kashiuchi, Tokyo (JP); Naoko Miyamoto, Tokyo (JP); Maho Takara, Tokyo (JP); Naohiko Uramoto, Yokohama (JP); Katsushi Yamashita, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,505

(22) Filed: Sep. 12, 2017

(65) Prior Publication Data

US 2018/0012026 A1 Jan. 11, 2018

Related U.S. Application Data

(63) Continuation of application No. 15/373,624, filed on Dec. 9, 2016, now Pat. No. 9,904,790, which is a
(Continued)

(30) Foreign Application Priority Data

Dec. 24, 2014 (JP) ................................. 2014-261376

(51) Int. Cl.
*H04L 29/06* (2006.01)
*G06F 21/10* (2013.01)
(Continued)

(52) U.S. Cl.
CPC ............ *H04L 63/061* (2013.01); *G06F 21/10* (2013.01); *G06F 21/602* (2013.01);
(Continued)

(58) Field of Classification Search
None
See application file for complete search history.

(56) References Cited

U.S. PATENT DOCUMENTS 6,792,113 B1 * 9/2004 Ansell ..................... G06F 21/10
380/284
9,294,285 B2 * 3/2016 Kato ..................... H04L 9/0844
(Continued)

FOREIGN PATENT DOCUMENTS

JP 2002541754 A 12/2002
JP 2013128207 A 6/2013
(Continued)

OTHER PUBLICATIONS

Notification of Reasons for Refusal, Patent Application No. 2014-261376, dated Apr. 11, 2016, 7 pages.
(Continued)

*Primary Examiner* — Trang T Doan
(74) *Attorney, Agent, or Firm* — Daniel C. Housley

(57) ABSTRACT

A method and system for recording data including content in a recording medium on a computer apparatus. First encrypted data, obtained by encrypting the data using a medium key created for each recording medium, is recorded in a recording medium. Second encrypted data, obtained by encrypting the medium key using a public key, is recorded in the recording medium. A private key corresponding to the public key is not recorded in the recording medium.

5 Claims, 14 Drawing Sheets

Related U.S. Application Data continuation of application No. 14/921,348, filed on Oct. 23, 2015.

(51) Int. Cl.
*G06F 21/60* (2013.01)
*H04L 9/08* (2006.01)
*H04L 9/14* (2006.01)
*H04L 9/30* (2006.01)

(52) U.S. Cl.
CPC .............. *H04L 9/0822* (2013.01); *H04L 9/14* (2013.01); *H04L 9/30* (2013.01); *H04L 63/045* (2013.01); *H04L 63/0428* (2013.01)

(56) References Cited

U.S. PATENT DOCUMENTS

| | | | |
|---|---|---|---|
| 9,524,746 B2* | 12/2016 | Nakano | G06F 21/10 |
| 2002/0129261 A1 | 9/2002 | Cromer et al. | |
| 2004/0003267 A1* | 1/2004 | Strom | G06F 21/10 |
| | | | 713/193 |
| 2004/0078586 A1* | 4/2004 | Sato | G06F 21/10 |
| | | | 713/193 |
| 2004/0190868 A1 | 9/2004 | Nakano et al. | |
| 2005/0114689 A1 | 5/2005 | Strom et al. | |
| 2006/0155991 A1 | 7/2006 | Kim et al. | |
| 2007/0014403 A1* | 1/2007 | Loo | H04N 5/765 |
| | | | 380/201 |
| 2007/0203838 A1 | 8/2007 | Lee et al. | |
| 2010/0054473 A1* | 3/2010 | Kobayashi | H04L 9/0827 |
| | | | 380/270 |
| 2012/0045062 A1* | 2/2012 | Kuno | G11B 20/00086 |
| | | | 380/277 |
| 2012/0102317 A1* | 4/2012 | Mathur | G06F 21/10 |
| | | | 713/156 |
| 2013/0268771 A1* | 10/2013 | Blankenbeckler | H04L 9/0866 |
| | | | 713/189 |
| 2014/0019775 A1* | 1/2014 | Powell | G06F 21/10 |
| | | | 713/193 |
| 2015/0261941 A1 | 9/2015 | Matsukawa et al. | |
| 2016/0062918 A1* | 3/2016 | Androulaki | G06F 12/1408 |
| | | | 713/193 |
| 2016/0191480 A1 | 6/2016 | Hoshino et al. | |
| 2017/0109538 A1 | 4/2017 | Hoshino et al. | |

FOREIGN PATENT DOCUMENTS

| | | |
|---|---|---|
| JP | 2013243667 A | 12/2013 |
| JP | 2013247676 A | 12/2013 |

OTHER PUBLICATIONS

Decision to Grant a Patent, Patent Application No. 2014-261376, dated Jun. 10, 2016, 6 pages.

Kamibayashi et al., IBM-20160620-1-8861723_NPL—English Translation.pdf, JetJigsaw: New Proposal for Copyright Protection System Using Peer-to-Peer Network, Document 2010-10031-037, 12 pages.

List of IBM Patents or Patent Applications Treated as Related, dated Sep. 11, 2017, pp. 1-2.

Hoshino et al., "Method and Apparatus for Using Data", Japan Application No. 2014-261376, Filed Dec. 24, 2014, 71 pages.

JPO office action (dated Apr. 19, 2016), Information Materials for IDS, 3 Pages.

Hoshino et al., "Recording Data and Using the Recorded Data", U.S. Appl. No. 15/701,514, filed Sep. 12, 2017.

* cited by examiner

RECORDING DATA AND USING THE RECORDED DATA

CROSS-REFERENCE TO RELATED APPLICATIONS

This application is a continuation of U.S. patent application Ser. No. 14/921,348 filed on 23 Oct. 2015 by Norihisa Hoshino, et al. and entitled RECORDING DATA AND USING THE RECORDED DATA, the entire disclosure of which is incorporated by reference herein. Related applications further include U.S. patent application Ser. Nos. 15/373,624 and 15/701,514.

TECHNICAL FIELD

The present invention relates generally to a method and an apparatus for using data, and in particular, the present invention relates to a method and an apparatus for using data including content recorded in a recording medium.

BACKGROUND

The current mainstream method for securely transferring data between two apparatuses is to connect a data receiving apparatus to a server over a network, gain user authentication, and acquire conditions of use and a decryption key.

However, if the data receiving apparatus is installed in an ocean-going ship, the method of connecting the apparatus to a server over a network has a problem in convenience when transferring data. This is because the recent increase in download time because of delay due to the distance to satellite orbits and low communication speeds, economic performance, etc. hinders downloading a massive amount of files unlike an overland network, although the communication environment has been improved by the Internet over satellite. Furthermore, satellite communications do not always ensure communications because of the navigation area, weather, etc.

The above problem also applies not only to the case in which the data receiving apparatus is installed in an ocean-going ship but also to a case in which the apparatus is an apparatus installed in a high-speed mobile unit, which is difficult to satisfy both a communication band and economic performance, or the apparatus is a portable personal computer (PC) that may be used without power.

SUMMARY

The present invention provides a method, and associated apparatus, system, and computer program product, for recording data including content in a recording medium on a computer apparatus. The method comprising the steps of: recording in a recording medium first encrypted data obtained by encrypting the data using a medium key created for each recording medium; and recording in the recording medium second encrypted data obtained by encrypting the medium key using a public key, wherein a private key corresponding to the public key is not recorded in the recording medium.

The present invention provides a method, and associated apparatus, system, and computer program product, for using data including content recorded in a recording medium on a computer apparatus. The recording medium holds first encrypted data obtained by encrypting the data using a medium key created in advance for each recording medium and second encrypted data obtained by encrypting the medium key using a public key. The method comprising the steps of: obtaining the medium key from the recording medium by decrypting the second encrypted data using a private key corresponding to the public key and available without using the recording medium; and obtaining the data from the recording medium by decrypting the first encrypted data using the obtained medium key.

DETAILED DESCRIPTION

Figure 1:
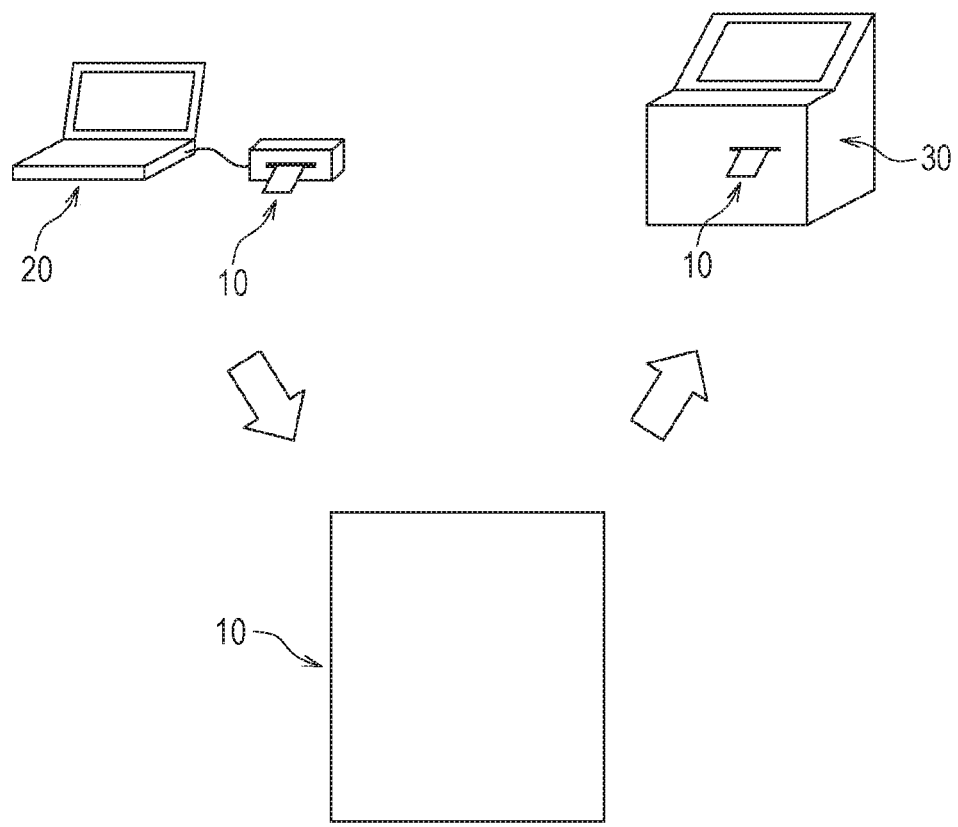
FIG. 1 is a diagram illustrating the general arrangement of a computer system, in accordance with embodiments of the present invention.

Embodiments of the present invention will be described herein below with reference to the attached drawings.

Embodiments of the present invention allow only a specified apparatus to obtain data from a recording medium in which first encrypted data obtained by encrypting the data using a medium key and second encrypted data obtained by encrypting the medium key are stored.

The present invention provides a method for recording data including content in a recording medium on a computer apparatus. The method includes the steps of recording in a recording medium first encrypted data obtained by encrypting the data using a medium key created for each recording medium, and recording in the recording medium second encrypted data obtained by encrypting the medium key using a public key. A private key corresponding to the public key is provided by means other than the recording medium.

In this method, in the step of recording the first encrypted data in the recording medium, the first encrypted data may be obtained by further encrypting the data using medium-attribute information indicating an attribute of the recording medium.

In this method, in the step of recording the second encrypted data in the recording medium, the second encrypted data may be obtained by further encrypting the medium key using medium-attribute information indicating an attribute of the recording medium.

In this method, the private key may be encrypted using code information given in common to the computer apparatus and an apparatus that uses the data.

In this method, the data may include a common key and encrypted-content information obtained by encrypting information on the content using the common key.

The present invention provides a method for using data including content recorded in a recording medium on a computer apparatus. The recording medium holds first encrypted data and second encrypted data. The first encrypted data is obtained by encrypting the data using a medium key created in advance for each recording medium. The second encrypted data is obtained by encrypting the medium key using a public key. The method includes the steps of obtaining the medium key from the recording medium by decrypting the second encrypted data using a private key corresponding to the public key and available without using the recording medium, and obtaining the data from the recording medium by decrypting the first encrypted data using the obtained medium key.

In this method, the first encrypted data may be obtained by further encrypting the data using medium-attribute information indicating an attribute of the recording medium. In the step of obtaining the data, the data may be obtained by decrypting the first encrypted data using the medium-attribute information.

In this method, the second encrypted data may be obtained by further encrypting the medium key using medium-attribute information indicating an attribute of the recording medium. In the step of obtaining the medium key, the medium key may be obtained by decrypting the second encrypted data using the medium-attribute information.

The method may further include the step of storing third encrypted data obtained by encrypting the private key with apparatus attribute information indicating an attribute of the computer apparatus. When the private key is to be used, the private key may be obtained by decrypting the third encrypted data using the apparatus attribute information.

In this method, the private key may be encrypted using code information given in common to the computer apparatus and an apparatus that records the data in the recording medium. When the private key is to be used, the private key may be obtained by decrypting the encrypted private key using the code information.

Furthermore, in this method, the data may include a common key and encrypted-content information obtained by encrypting information on the content using the common key. In the step of obtaining the data, the information on the content may be obtained by decrypting the encrypted-content information using the common key.

The present invention provides an apparatus that uses data including content recorded in a recording medium. The recording medium holds first encrypted data and second encrypted data. The first encrypted data is obtained by encrypting the data using a medium key created in advance for each recording medium. The second encrypted data is obtained by encrypting the medium key using a public key. The apparatus includes a medium-key acquisition section and a data acquisition section. The medium-key acquisition section obtains the medium key from the recording medium by decrypting the second encrypted data using a private key corresponding to the public key and available without using the recording medium. The data acquisition section obtains the data from the recording medium by decrypting the first encrypted data using the obtained medium key.

Furthermore, the present invention provides a computer program product comprising program code causing a computer to function as an apparatus that uses data including content recorded in a recording medium. The recording medium holds first encrypted data and second encrypted data. The first encrypted data is obtained by encrypting the data using a medium key created in advance for each recording medium. The second encrypted data is obtained by encrypting the medium key using a public key. The program product causes the computer to function as a medium-key acquisition section and a data acquisition section. The medium-key acquisition section obtains the medium key from the recording medium by decrypting the second encrypted data using a private key corresponding to the public key and available without using the recording medium. The data acquisition section obtains the data from the recording medium by decrypting the first encrypted data using the obtained medium key.

The present invention allows only a specified apparatus to obtain data from a recording medium in which first encrypted data obtained by encrypting the data using a medium key and second encrypted data obtained by encrypting the medium key are stored.

FIG. 1 is a diagram illustrating the general arrangement of a computer system, in accordance with embodiments of the present invention. As shown in FIG. 1, the computer system includes an information storage medium 10, an information writing apparatus 20, and an information processing apparatus 30. It is assumed that the information writing apparatus 20 holds data to be transferred to the information processing apparatus 30, but the information writing apparatus 20 and the information processing apparatus 30 are not always connected together over a communication line for use in transferring the data. Thus, in this computer system, the information writing apparatus 20 transfers data to the information processing apparatus 30 in such way that the information writing apparatus 20 writes encrypted data into the information storage medium 10, the information processing apparatus 30 reads the encrypted data from the information storage medium 10 and decrypts the encrypted data. The following description will be made taking content protected by copyright as an example of the data and a system for transferring the content from land to a ship as an example of the computer system, but not limited thereto. In this embodiment, the content includes structure plans, structural calculation reports, and instruction manuals included in ship construction documents.

The information storage medium 10 is an example of recording media, which is a medium for storing encrypted content obtained by encrypting content to be transferred by the information writing apparatus 20 to the information processing apparatus 30, as described above. Examples of the information storage medium 10 include a USB flash drive (USB memory in Japanese), a compact flash card, and an SD memory card.

The information writing apparatus 20 is an example of a first apparatus, which writes encrypted content into the information storage medium 10, as described above. An example of the information writing apparatus 20 is an apparatus installed in a land office that supports the operation of a ship. Thus, the operation of writing content in the information storage medium 10 may also be performed in the land office.

The information processing apparatus 30 is an example of a second apparatus, which reads encrypted content written in the information storage medium 10 and decrypts the encrypted content for processing. Specifically, when the information storage medium 10, in which encrypted content is written by the information writing apparatus 20, is mounted, the information processing apparatus 30 executes a process of using the content within the range of right-of-use information on the encrypted content. Examples of the information processing apparatus 30 include apparatuses installed in a wheelhouse, an engine room, and so on of a ship.

A method for recording data in the information storage medium 10 according to embodiments of the present invention will be described.

Figure 2B:
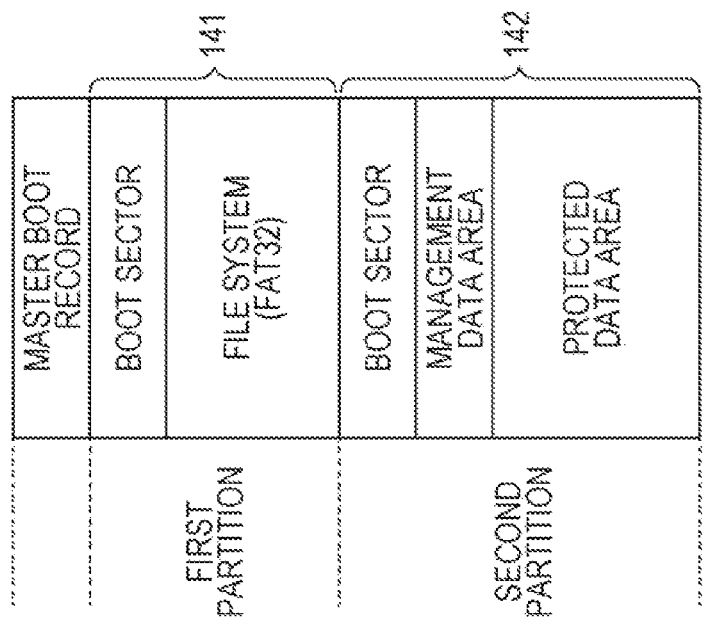
FIG. 2(b) is a diagram illustrating the memory map of a flash memory core, in accordance with embodiments of the present invention.
Figure 2A:
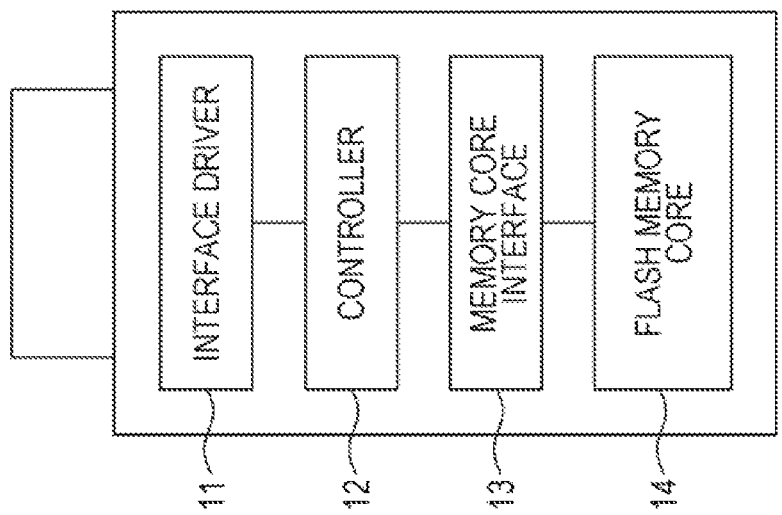
FIG. 2(a) is a diagram illustrating an example of the internal configuration of an information storage medium, in accordance with embodiments of the present invention.

FIG. 2(a) is a diagram illustrating an example of the internal configuration of the information storage medium 10, in accordance with embodiments of the present invention. The information storage medium 10 is a hardware recording medium. As shown in FIG. 2(a), the information storage medium 10 includes an interface driver 11, a controller 12, a memory core interface 13, and a flash memory core 14.

The interface driver 11 drives an interface for inputting and outputting information to and from a higher-level device.

The controller 12 inputs and outputs signals to and from the interface driver 11. The controller 12 is configured to be able to obtain information indicating the attributes of the information storage medium 10 (hereinafter referred to as medium-attribute information) from the outside. Examples of the medium-attribute information include the manufacturer name, the product name, the product serial number, and the storage capacity of the information storage medium 10. The medium-attribute information is determined at production and cannot be changed afterwards.

The memory core interface 13 is an interface for communications between the controller 12 and the flash memory core 14.

The flash memory core 14 is a section in/from which information is written, read, and deleted with the memory core interface 13.

FIG. 2(b) is a diagram illustrating the memory map of the flash memory core 14, in accordance with embodiments of the present invention. As shown in FIG. 2(b), the flash memory core 14 can be used similarly to a hard disk drive, in which two partitions can be set in a partition table in a master boot record. Here, the two partitions are referred to as a first partition 141 and a second partition 142. The first partition 141 is an area initialized in an ISO/IEC 9293 format that allows reading and writing with a user interface of the OS of a higher-level device. The second partition 142 is an area which cannot be operated with the user interface provided by the OS of the higher-level device and which is initialized in a format in which files cannot be generated, deleted, written, and read with a standard application programming interface (API) of the OS. Thus, if the information storage medium 10 is mounted in a PC, files stored in the first partition 141 can be displayed in a list form and can be selected from the list with the user interface provided by the OS, but files stored in the second partition 142 can neither be displayed in a list form or be selected therefrom.

This embodiment relates to a method for recording data in the second partition 142 and a method for processing the recorded data. Accordingly, the data in the first partition 141 may be any format of data, or alternatively, the first partition 141 may not be provided. This embodiment will be described focusing on an example in which the first partition 141 and the second partition 142 are provided.

Examples of the data recorded in the first partition 141 include data on a program for using content, a program for installing the program, and a procedure manual describing a method for using the programs. Another example is an encrypted file that can be read only by a user having a decryption key.

Hereinafter, the controller 12 is referred to as a controller Mc. The first partition 141 is referred to as a general area Mg, and the second partition 142 is referred to as a protected area Mp.

Figure 3:
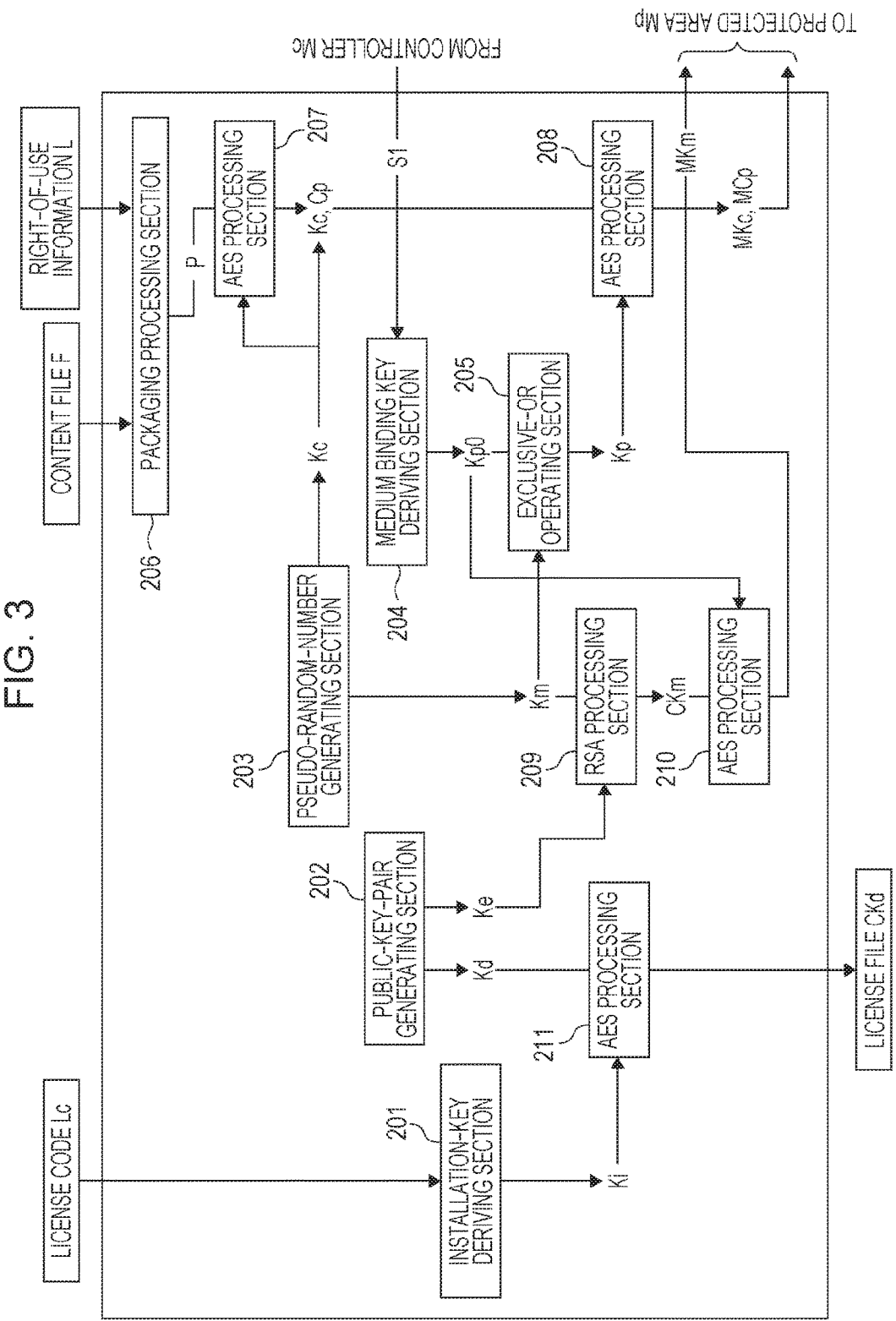
FIG. 3 is a block diagram illustrating the functional configuration of an information writing apparatus, in accordance with embodiments of the present invention.

FIG. 3 is a block diagram illustrating an example of the functional configuration of the information writing apparatus 20, in accordance with embodiments of the present invention. As shown in FIG. 3, the information writing apparatus 20 includes an installation-key deriving section 201, a public-key-pair generating section 202, a pseudo-random-number generating section 203, a medium binding key deriving section 204, and an exclusive-OR operating section 205. The information writing apparatus 20 further includes a packaging processing section 206, an advanced-encryption-standard (AES) processing section 207, and an AES processing section 208. The information writing apparatus 20 further includes a Rivest Shamir Adleman (RSA) processing section 209, an AES processing section 210, and an AES processing section 211.

The installation-key deriving section 201 derives an apparatus installation key Ki from a license code Lc. The license code Lc is an example of code information. The public-key-pair generating section 202 generates a medium-key encryption key Ke and a medium-key decryption key Kd as an RSA-format public key and private key pair. The pseudo-random-number generating section 203 generates a package key Kc for each content file F and a medium key Km for each information storage medium 10. The medium binding key deriving section 204 derives a medium binding key Kp0 from medium-attribute information S1. The exclusive-OR operating section 205 derives a protected area key Kp by exclusive ORing the medium binding key Kp0 with the medium key Km.

The packaging processing section 206 generates a content package P from the content file F and right-of-use information L which identifies one or more users authorized to access the content file F. The AES processing section 207 encrypts the content package P with the package key Kc to derive an encrypted package Cp. The AES processing section 208 encrypts the package key Kc and the encrypted package Cp with the protected area key Kp to derive a medium-bound package key MKc and a medium-bound encrypted package MCp and stores the medium-bound package key MKc and the medium-bound encrypted package MCp in the protected area Mp. The package key Kc and the encrypted package Cp are examples of data, and the medium-bound package key MKc and the medium-bound encrypted package MCp are examples of first encrypted data.

The RSA processing section 209 encrypts the medium key Km with the medium-key encryption key Ke to derives an encrypted medium key CKm. The AES processing section 210 encrypts the encrypted medium key CKm with the medium binding key Kp0 to derive a medium-bound encrypted medium key MKm and stores MKm in the protected area Mp. The medium-bound encrypted medium key MKm is an example of second encrypted data. The AES processing section 211 encrypts the medium-key decryption key Kd with the apparatus installation key Ki to derive a license file CKd. The license file CKd is an example of fourth encrypted data.

Next, an operation performed when the information writing apparatus 20 with such a configuration stores data in the protected area Mp of the information storage medium 10 will be described.

The information storage medium 10 available in a PC or the like has a master boot record in a first sector as shown in FIG. 2(b). The master boot record includes a partition table for logically partitioning the information storage medium 10 for use as a plurality of logical storage devices. The partition table includes information on "boot identifier", "start position", "end position", and "partition ID" of the partition, "system ID" indicating the kind of the file system, "offset" indicating the distance from the head of the disk to the partition, and "total sector count" indicating the capacity of the partition. In general, the partition table of the information storage medium 10 at factory default setting includes one partition.

However, the information writing apparatus 20 rewrites the partition table into two partitions. In other words, to convert the first partition 141 to the general area Mg, the information writing apparatus 20 registers a file system (for example, FAT32), which is generally used by the OS, in the "system ID" and formats the first partition 141 in its file system format. To convert the second partition 142 to the protected area Mp, the information writing apparatus 20 formats the second partition 142 in an encryption exclusive format that the apparatus of this embodiment uses.

In this state, individual files, such as structure plans, structural calculation reports, and instruction manuals, are given as the content file F, and information on the right of use, of the content file F by a user, that the writers of those files preset is given as the right-of-use information L to the information writing apparatus 20. Thus, the information writing apparatus 20 stores the data in the information storage medium 10 in the following procedure.

Figure 4:
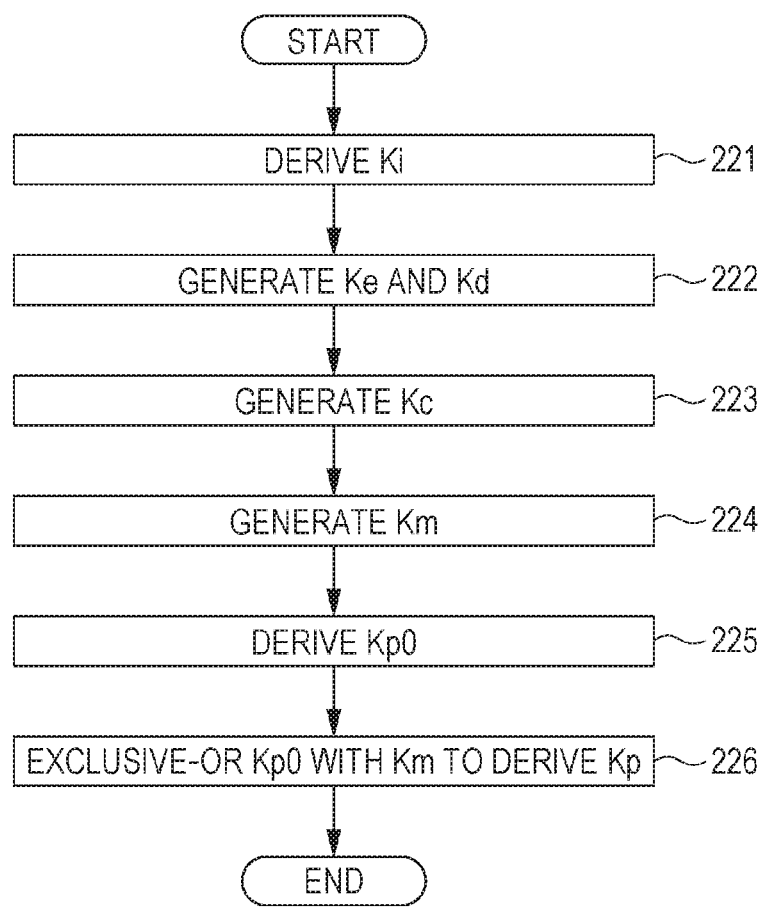
FIG. 4 is a flowchart illustrating an operation for preparing keys performed by the information writing apparatus, in accordance with embodiments of the present invention.
Figure 5:
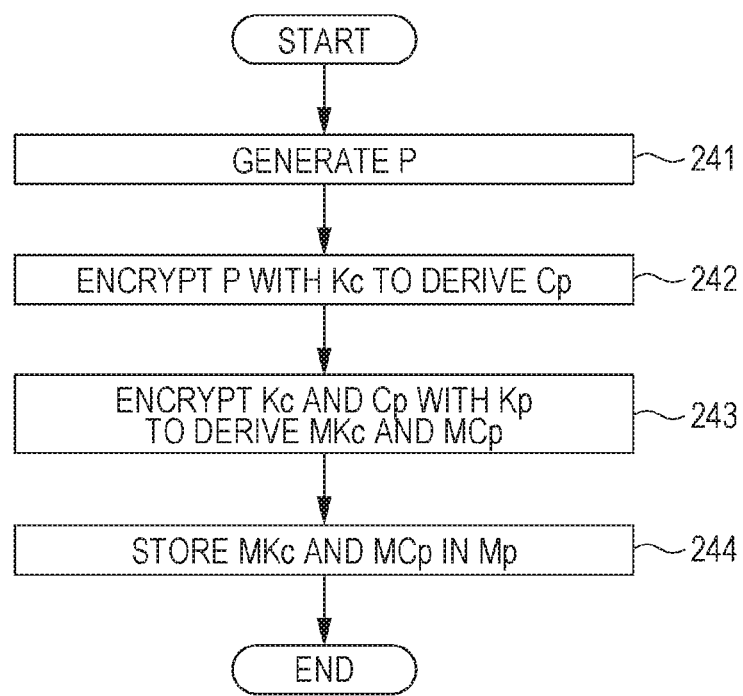
FIG. 5 is a flowchart illustrating an operation for generating and storing an encrypted package performed by the information writing apparatus, in accordance with embodiments of the present invention.

FIGS. 4 and 5 depict a method for recording data.

First, the information writing apparatus 20 prepares keys necessary for the writing process. FIG. 4 is a flowchart illustrating an example of operation therefor performed by the information writing apparatus 20, in accordance with embodiments of the present invention. In advance of the operation, the license code Lc is registered in the information writing apparatus 20.

When the operation is started, the information writing apparatus 20 derives the apparatus installation key Ki from the license code Lc by calculating f1(Lc) with the installation-key deriving section 201 using an installation-key deriving function f1 (step 221). Here, the installation-key deriving function f1 is a function for deriving data with a bit length necessary for an encryption key from the license code Lc.

The public-key-pair generating section 202 prepares the medium-key encryption key Ke as a public key and the medium-key decryption key Kd as a private key (step 222). In this case, although the public-key-pair generating section 202 present in the information writing apparatus 20 issues the public key pair, the public key pair may be obtained from an external digital certification service.

Furthermore, the pseudo-random-number generating section 203 generates a first random number and creates, using the first generated random number, the package key Kc for each content file F (step 223). The pseudo-random-number generating section 203 also generates a second random number and creates, using the second generated random number, the medium key Km for each information storage medium 10 (step 224).

Furthermore, the medium binding key deriving section 204 derives a medium binding key Kp0 by giving the medium-attribute information S1 obtained from the controller Mc of the information storage medium 10 to a medium binding key deriving function f2 to calculate f2(S1) (step 225).

Thereafter, the exclusive-OR operating section 205 exclusive ORs the medium binding key Kp0 with the medium key Km to derive the protected area key Kp (step 226).

Next, the information writing apparatus 20 generates the encrypted package Cp and stores the encrypted package Cp in the information storage medium 10. FIG. 5 is a flowchart illustrating an example of operation for generating and storing the encryption package Cp, performed by the information writing apparatus 20, in accordance with embodiments of the present invention.

When the operation is started, the information writing apparatus 20 integrates the content file F and the right-of-use information L to form the content package P with the packaging processing section 206 (step 241). Thus, the AES processing section 207 encrypts the content package P (to form an encrypted P) with the package key Kc to generate the encrypted package Cp (step 242).

Next, the AES processing section 208 encrypts the package key Kc and the encrypted package Cp with the protected area key Kp to respectively generate the medium-bound package key MKc and the medium-bound encrypted package MCp (step 243). The medium-bound package key MKc and the medium-bound encrypted package MCp are stored in the protected area Mp (step 244).

Figure 6:
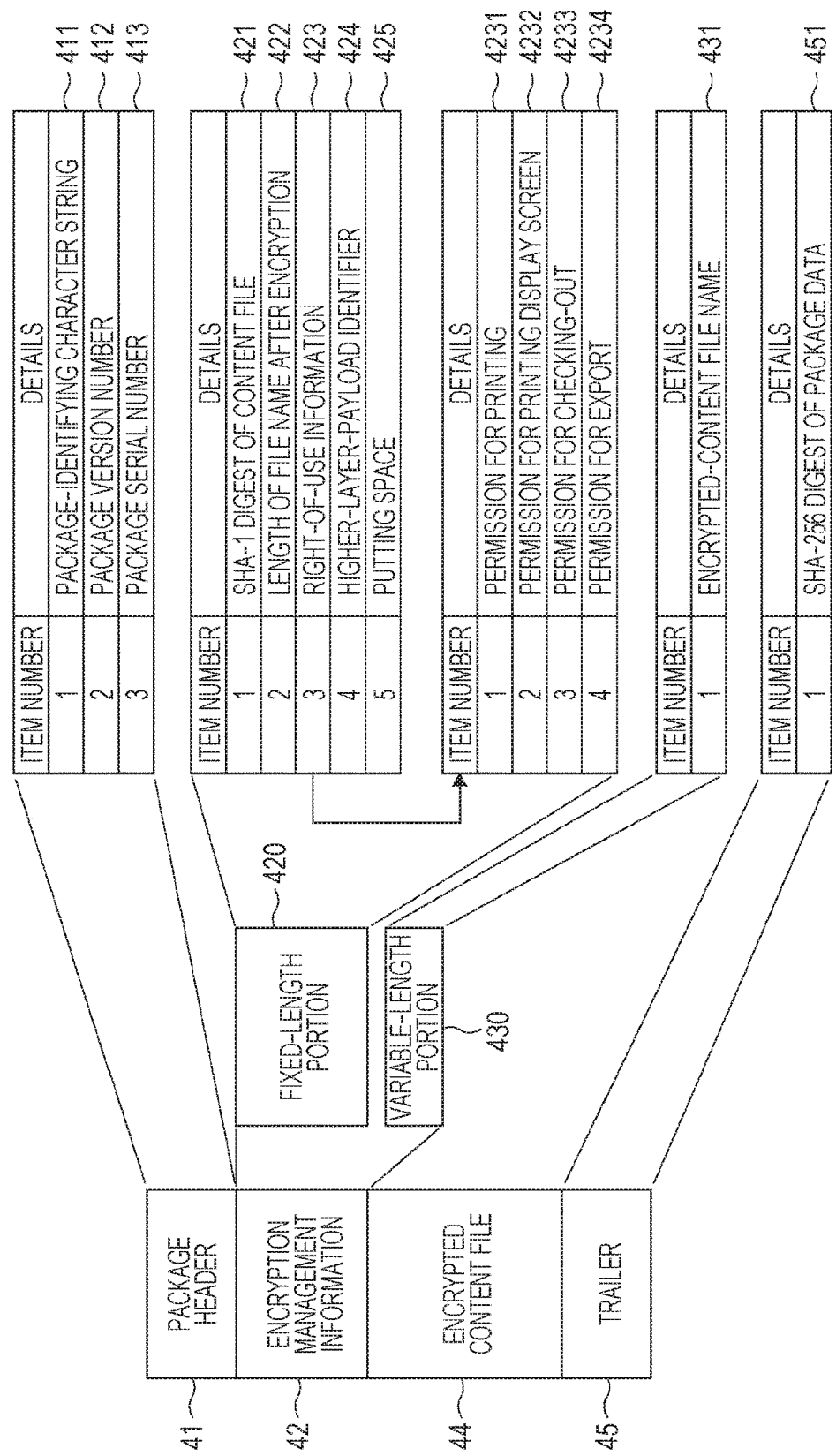
FIG. 6 is a diagram illustrating an example of the format of the encrypted package, in accordance with embodiments of the present invention.

The encrypted package Cp generated in step 242 of FIG. 5 will now be described. FIG. 6 is a diagram illustrating an example of the format of the encrypted package Cp, in accordance with embodiments of the present invention. As shown in FIG. 5, the encrypted package Cp includes a package header 41, encryption management information 42, an encrypted content file 44 comprising the encrypted content package P, and a trailer 45.

First, the package header 41 is an unencrypted area and includes a package-identifying character string 411, a package version number 412, and a package serial number 413. Among them, the package-identifying character string 411 and the package version number 412 are used to determine whether the data can be processed by the information processing apparatus 30. The package serial number 413 is used to refer to a data generation history or the like.

The encryption management information 42 includes a fixed length section 420 and a variable length section 430. The fixed length section 420 includes a SHA-1 digest 421 of the content file F, length of file name after encryption 422, right-of-use information 423, a higher-layer-payload identifier 424, putting space 425, and so on. The SHA-1 digest 421 of the content file is an SHA-1 digest of the content file before being encrypted and is used to detect falsification. The right-of-use information 423 includes permission for printing 4231, permission for printing a display screen 4232, permission for checking-out 4233, permission for export 4234, and so on, which has one-bit flag information indicating permission or non-permission. The higher-layer-payload identifier 424 provides information in the format of the encrypted content file 44. The variable length section 430 holds an encrypted content file name 431.

The trailer 45 is a SHA-256 digest of package data 451.

Figure 7:
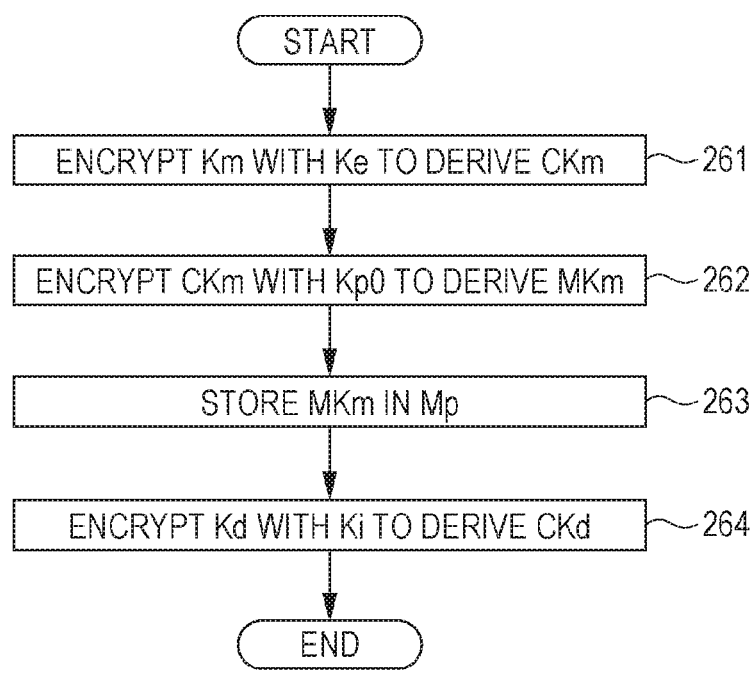
FIG. 7 is a flowchart illustrating an operation for storing a medium key and generating a license file performed by the information writing apparatus, in accordance with embodiments of the present invention.

Next, the information writing apparatus 20 stores the medium key Km in the information storage medium 10 and generates the license file CKd. FIG. 7 is a diagram illustrating an example of operation therefor performed by the information writing apparatus 20, in accordance with embodiments of the present invention.

When the operation is started, the information writing apparatus 20 encrypts the medium key Km with the RSA processing section 209 using the medium-key encryption key Ke to derive the encrypted medium key CKm (step 261).

Next, the AES processing section 210 encrypts the encrypted medium key CKm with the medium binding key Kp0 to derive the medium-bound encrypted medium key MKm (step 262). The medium-bound encrypted medium key MKm is stored in the protected area Mp (step 263).

The AES processing section 211 encrypts the medium-key decryption key Kd with the apparatus installation key Ki to generate the license file CKd (step 264). Thereafter, the license file CKd is sent to a person in charge in the ship in which the information processing apparatus 30 is installed by means different from the information storage medium 10. Assuming that the information storage medium 10 is sent to port when the ship calls at the port, examples of the different means include emailing the license file CKd to the mail address of the person in charge of the ship and sending the license file CKd to the port separately from the information storage medium 10.

Figure 8:
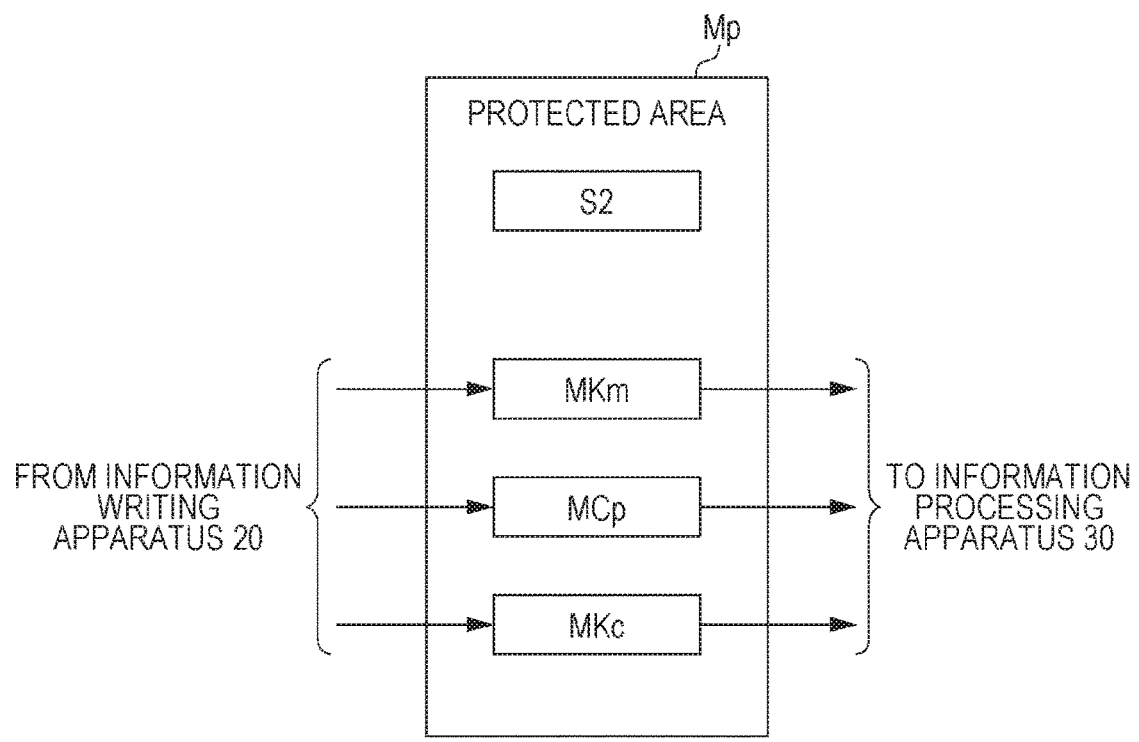
FIG. 8 is a diagram illustrating the format of a protected area of the information storage medium, in accordance with embodiments of the present invention.

FIG. 8 is a diagram illustrating the format of the protected area Mp of the information storage medium 10, in accordance with embodiments of the present invention. As shown in FIG. 8, a serial number S2 is stored in the protected area Mp. Furthermore, the medium-bound encrypted package MCp, the medium-bound package key MKc, and the medium-bound encrypted medium key MKm are written in the protected area Mp by the information writing apparatus 20. The individual items of data will be described herein below.

First, the serial number S2 will be described. The serial number S2 is a number for uniquely identifying the information storage medium 10 and the protected area Mp. The serial number S2 is also used as an identifier for identifying the medium-key decryption key Kd for use in decrypting the medium-bound encrypted medium key MKm. The serial number S2 is recorded in the boot sector (see FIG. 2).

Secondarily, the medium-bound encrypted package MCp will be described. As described above, the medium-bound encrypted package MCp is a key obtained by encrypting the content package P with the package key Kc and further encrypting it with the protected area key Kp. The original content package P can be obtained by decrypting the medium-bound encrypted package MCp with the protected area key Kp and further decrypting it with the package key Kc. The protected area key Kp is a key derived from the medium binding key Kp0 and the medium key Km. Since the protected area key Kp includes the medium binding key Kp0 as an element, as described above, a different protected area key Kp is derived for a different information storage medium. Accordingly, if the entire information storage medium 10 is copied in another information storage medium, the protected area key Kp used in encryption is not obtained at decryption. Thus, the medium-bound encrypted package MCp cannot be decrypted, so that the encrypted package Cp cannot be used.

Thirdly, the medium-bound package key MKc will be described. As described above, the medium-bound package key MKc is a key obtained by encrypting the package key Kc with the protected area key Kp derived from the medium binding key Kp0 and the medium key Km. The package key Kc is a key for decrypting the encrypted package Cp to obtain the original content package P. Since the protected area key Kp includes the medium binding key Kp0 as an element, a different protected area key Kp is derived for a different information storage medium. Accordingly, if the entire information storage medium 10 is copied to another information storage medium, the protected area key Kp used in encryption cannot be obtained at decryption, so that the medium-bound package key MKc cannot be decrypted, and thus the encrypted package Cp cannot be decrypted with the package key Kc for usage.

Fourthly, the medium-bound encrypted medium key MKm will be described. As described above, the medium-bound encrypted medium key MKm is a key obtained by encrypting the encrypted medium key CKm, which is obtained by encrypting the medium key Km with the medium-key encryption key Ke, with the medium binding key Kp0. The medium key Km is obtained by decrypting the medium-bound encrypted medium key MKm with the medium binding key Kp0 to derive the encrypted medium key CKm and further decrypting it with the medium-key decryption key Kd. The medium-key decryption key Kd is a decryption key paired with the medium-key encryption key Ke. Thus, using the medium binding key Kp0 derived from the information storage medium 10 prevents copying from the information storage medium 10. The information processing apparatus 30 cannot decrypt the encrypted medium key CKm to derive the medium key Km without the medium-key decryption key Kd. Accordingly, the information processing apparatus 30 also cannot derive the protected area key Kp from the medium key Km and the medium binding key Kp0. As a result, the information processing apparatus 30 cannot decrypt the medium-bound encrypted package MCp and the medium-bound encrypted medium key MKm. In other words, the medium-bound encrypted medium key MKm limits the information processing apparatus 30 in which the information storage medium 10 can be used.

Figure 9:
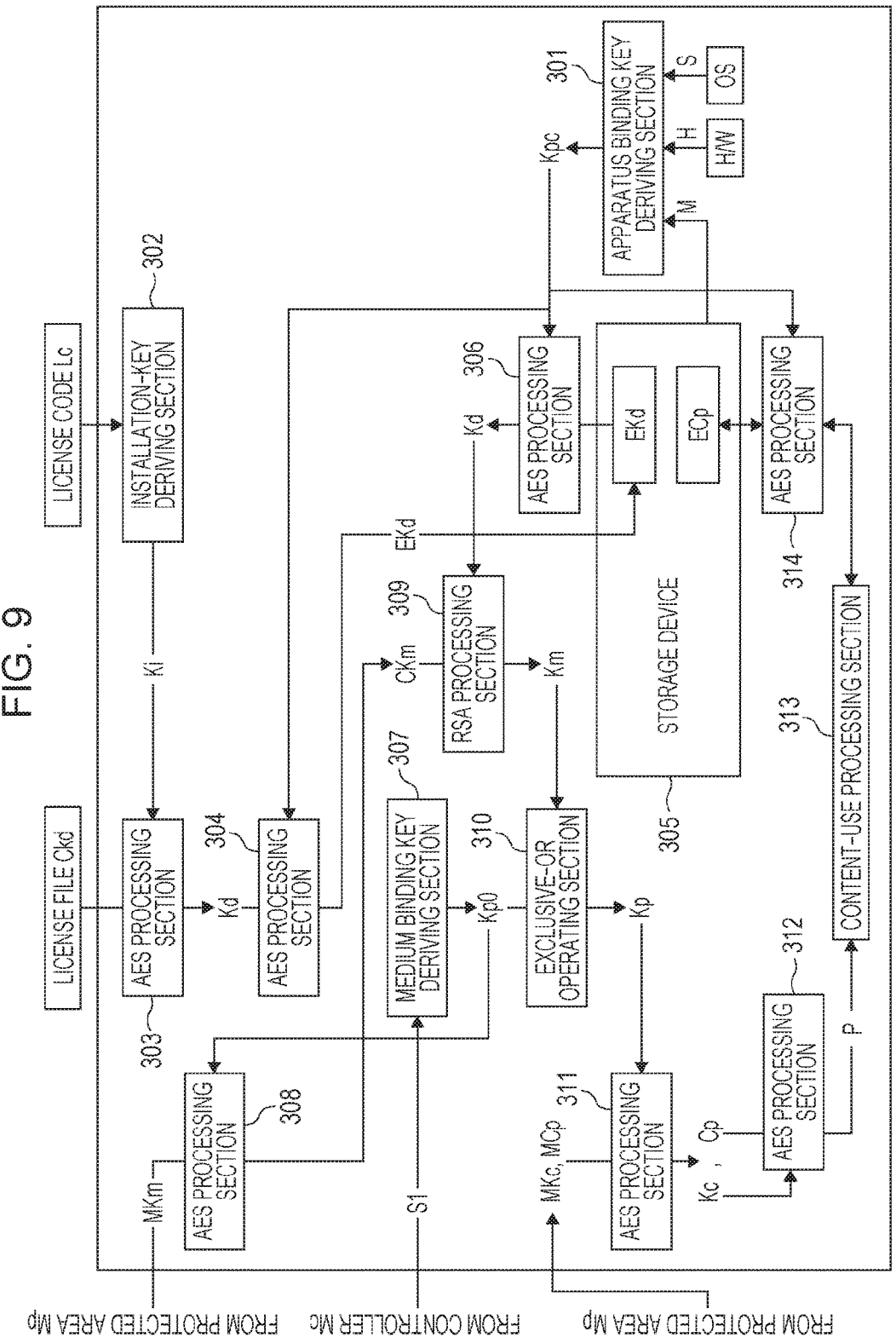
FIG. 9 is a block diagram illustrating the functional configuration of an information processing apparatus, in accordance with embodiments of the present invention.

FIG. 9 is a block diagram illustrating an example of the functional configuration of the information processing apparatus 30, in accordance with embodiments of the present invention. As shown in FIG. 9, the information processing apparatus 30 includes an apparatus binding key deriving section 301, an installation-key deriving section 302, an AES processing section 303, an AES processing section 304, and a storage device 305. The information processing apparatus 30 further includes an AES processing section 306, a medium binding key deriving section 307, an AES processing section 308, an RSA processing section 309, and an exclusive-OR operating section 310. The information processing apparatus 30 further includes an AES processing section 311, an AES processing section 312, a content-use processing section 313, and an AES processing section 314.

The apparatus binding key deriving section 301 derives an apparatus binding key Kpc from attribute information M on the storage device 305, attribute information H on hardware, attribute information S on the OS, and so on. The installation-key deriving section 302 derives the apparatus installation key Ki from the license code Lc. The AES processing section 303 decrypts the license file CKd with the apparatus installation key Ki to derive the medium-key decryption key Kd. The license file CKd is an example of the fourth encrypted data. The license code Lc is an example of the code information, and the AES processing section 303 is an example of a private-key acquisition section. The AES processing section 304 encrypts the medium-key decryption key Kd with the apparatus binding key Kpc to derive an apparatus binding medium-key decryption key EKd and stores the apparatus-fixation medium-key decryption key EKd in the storage device 305. The storage apparatus 305 holds the apparatus-fixation medium-key decryption key EKd and an apparatus-fixation encrypted package ECp, described later.

The AES processing section 306 decrypts the apparatus-fixation medium-key decryption key EKd stored in the storage device 305 with the apparatus binding key Kpc to derive the medium-key decryption key Kd. The apparatus-fixation medium-key decryption key EKd is an example of third encrypted data. The AES processing section 306 is an example of the private-key acquisition section. The medium binding key deriving section 307 derives the medium binding key Kp0 from the medium-attribute information S1. The AES processing section 308 decrypts the medium-bound encrypted medium key MKm with the medium binding key Kp0 to derive the encrypted medium key CKm. The medium-bound encrypted medium key MKm is an example of the second encrypted data. The RSA processing section 309 decrypts the encrypted medium key CKm with the medium-key decryption key Kd to derive the medium key Km. The RSA processing section 309 is an example of a medium-key acquisition section. The exclusive-OR operating section 310 exclusive-ORs the medium binding key Kp0 with the medium key Km to derive the protected area key Kp.

The AES processing section 311 decrypts the medium-bound encrypted package MCp and the medium-bound package key MKc with the protected area key Kp to derive the encrypted package Cp and the package key Kc. The medium-bound encrypted package MCp and the medium-bound package key MKc are examples of the first encrypted data. The encrypted package Cp and the package key Kc are examples of the data. The AES processing section 311 is an example of a data acquisition section. The AES processing section 312 decrypts the encrypted package Cp with the package key Kc to derive the content package P. The encrypted package Cp is an example of encrypted-content information. The package key Kc is an example of a common key. The content package P is an example of information on the content. The content-use processing section 313 extracts the content file F and the right-of-use information L from the content package P and performs a process of using the content file F in accordance with the right-of-use information L. If the using process is export, the AES processing section 314 encrypts the encrypted package Cp with the apparatus binding key Kpc to derive the apparatus-fixation encrypted package ECp and stores the apparatus-fixation encrypted package ECp in the storage device 305. When the content package P stored in the storage device 305 is to be used, the AES processing section 314 decrypts the apparatus-fixation encrypted package ECp with the apparatus binding key Kpc to derive the encrypted package Cp.

Next, an operation performed when the information processing apparatus 30 with such a configuration reads data stored in the protected area Mp of the information storage medium 10 for usage will be described.

Figure 10:
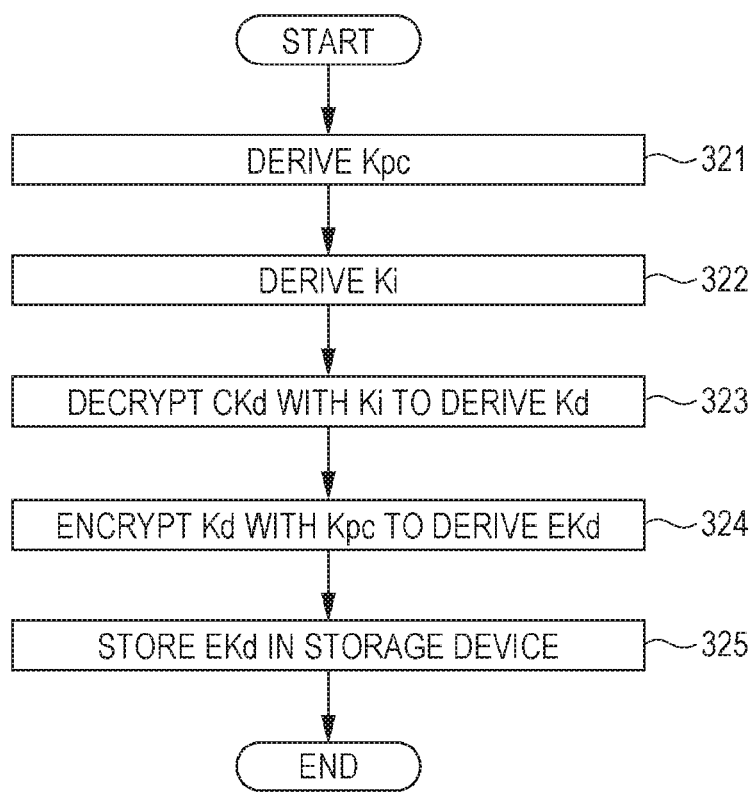
FIG. 10 is a flowchart illustrating an operation performed by the information processing apparatus before the information storage medium is used, in accordance with embodiments of the present invention.

First, before using the information storage medium 10, the information processing apparatus 30 stores the apparatus-fixation medium-key decryption key EKd in the storage device 305. FIG. 10 is a flowchart illustrating an example of operation therefor performed by the information processing apparatus 30, in accordance with embodiments of the present invention. Assume that the license file CKd is read into the information processing apparatus 30 in advance of the operation. The license file CKd is sent to the information processing apparatus 30 by means different from the information storage medium 10, as described above. The license code Lc printed on a license has also been input to the information processing apparatus 30. The license code Lc is generally sent to the information processing apparatus 30 at the same time as the time when the information storage medium 10 is sent.

When the operation is started, in the information processing apparatus 30, the apparatus binding key deriving section 301 derives the apparatus binding key Kpc from information indicating the attributes of the information processing apparatus 30 (hereinafter referred to as apparatus attribute information) (step 321). Examples of the apparatus attribute information include the attribute information M on the storage device 305, the attribute information H on the hardware, and the attribute information S on the OS. In this case, the apparatus binding key deriving section 301 derives the apparatus binding key Kpc by giving the attribute information M, H, and S to an apparatus binding key deriving function f3 to calculate f3(M, H, S). Specifically, the apparatus binding key deriving function f3 is a function for deriving data with a bit length necessary for the encryption key from unrewritable apparatus attribute information, such as the model number of the information processing apparatus 30, the serial number of the main board, and the product ID of the OS.

The installation-key deriving section 302 derives the apparatus installation key Ki from the license code Lc by calculating f1(Lc) using the installation-key deriving function f1 (step 322).

Next, the AES processing section 303 decrypts the license file CKd with the apparatus installation key Ki to derive the medium-key decryption key Kd (step 323).

Thereafter, the AES processing section 304 encrypts the medium-key decryption key Kd with the apparatus binding key Kpc to derive the apparatus-fixation medium-key decryption key EKd (step 324). The apparatus-fixation medium-key decryption key EKd is stored in the storage device 305 (step 325).

Figure 11:
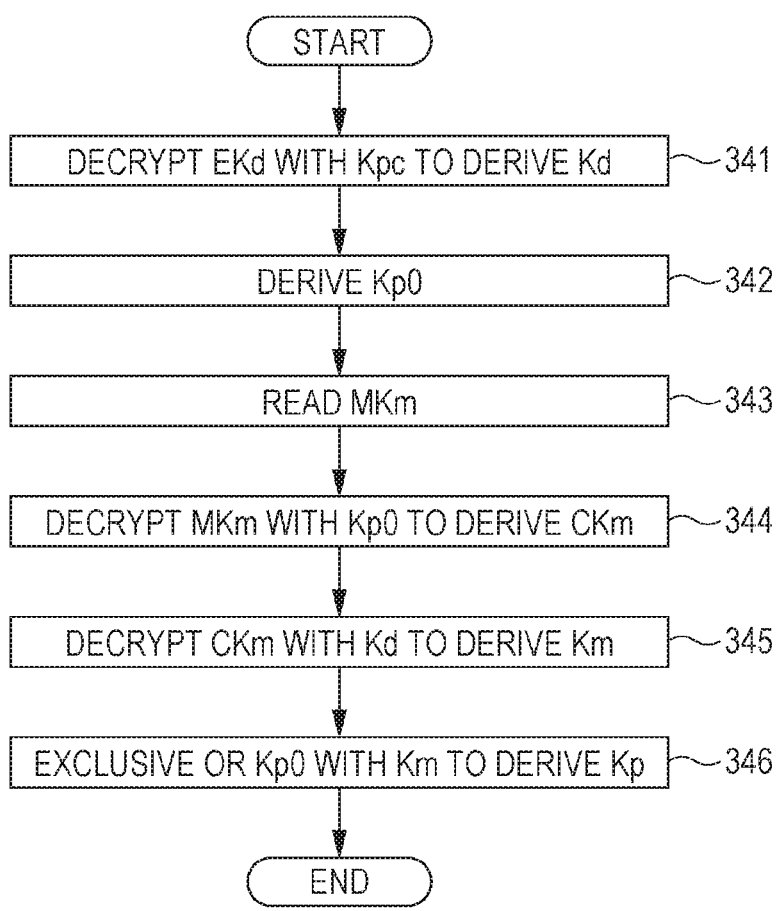
FIG. 11 is a flowchart illustrating an operation for obtaining a protected area key performed by the information processing apparatus, in accordance with embodiments of the present invention.

Next, the information processing apparatus 30 obtains the protected area key Kp for decrypting the protected area Mp of the information storage medium 10. FIG. 11 is a flowchart illustrating an example of an operation for deriving Kp, performed by the information processing apparatus 30, in accordance with embodiments of the present invention.

When the operation is started, in the information processing apparatus 30, the AES processing section 306 decrypts the apparatus-fixation medium-key decryption key EKd stored in the storage device 305 with the apparatus binding key Kpc to derive the medium-key decryption key Kd (step 341).

The medium binding key deriving section 307 reads the medium-attribute information S1 and calculates f2(S1) using the medium binding key deriving function f2 to derive the medium binding key Kp0 (step 342). The medium binding key deriving function f2 is a function for calculating data with a bit length necessary for the encryption key from unrewritable information obtained from the information storage medium 10.

Next, the AES processing section 308 reads the medium-bound encrypted medium key MKm (step 343). Then, the AES processing section 308 decrypts the medium-bound encrypted medium key MKm with the medium binding key Kp0 to derive the encrypted medium key CKm (step 344).

Next, the RSA processing section 309 decrypts the encrypted medium key CKm with the medium-key decryption key Kd to derive the medium key Km (step 345).

Thereafter, the exclusive-OR operating section 310 exclusive ORs the medium binding key Kp0 with the medium key Km to derive the protected area key Kp (step 346).

When the protected area key Kp is derived, the information processing apparatus 30 uses the content file F on the basis of the right-of-use information L. Assume that the information storage medium 10 holds N medium-bound encrypted packages MCp1 to MCpN and N medium-bound package keys MKc1 to MKcN. Further, assume that the protected area Mp holds a medium-bound content list obtained by encrypting a content list containing the name of the stored content file F and additional information with the protected area key Kp. The protected area Mp also holds medium-bound expiration information obtained by encrypting expiration information with the protected area key Kp.

Figure 12:
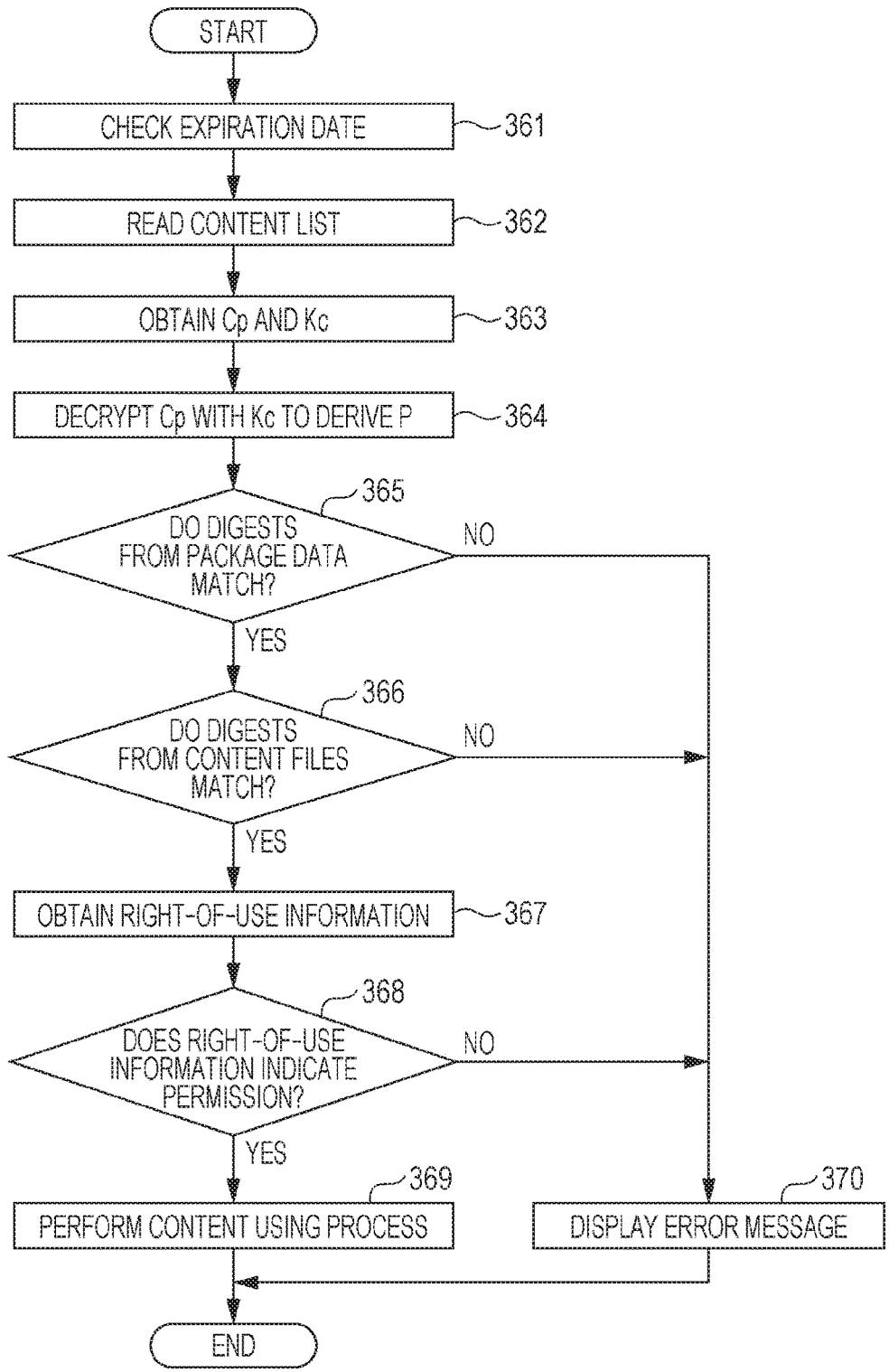
FIG. 12 is a flowchart illustrating an operation for using a content file in the information storage medium performed by the information processing apparatus, in accordance with embodiments of the present invention.

FIG. 12 is a flowchart illustrating an example of operation therefor performed by the information processing apparatus 30, in accordance with embodiments of the present invention.

When the operation is started, the information processing apparatus 30 first checks the expiration date of the information storage medium 10 (step 361). Specifically, the information processing apparatus 30 decrypts the medium-bound expiration information stored in the information storage medium 10 with the protected area key Kp to read the original expiration information. Then, the information processing apparatus 30 determines whether the present date has passed the expiration date indicated by the expiration information. If the validity has expired, the information processing apparatus 30 stops the process and requests input of a password that is valid until the next expiration date.

Next, the information processing apparatus 30 reads the content list in the same way (step 362). Then, the content list is presented to the user to prompt to select the content file F. When the content file F is selected by the user, the AES processing section 311 obtains the encrypted package Cp and the package key Kc (step 363). Specifically, the AES processing section 311 reads the medium-bound encrypted package MCp and the medium-bound package key MKc stored in the information storage medium 10 from the protected area Mp and decrypts them with the protected area key Kp to derive the encrypted package Cp and the package key Kc. Thus, the AES processing section 312 decrypts the encrypted package Cp with the package key Kc to derive the content package P (step 364).

Next, the content-use processing section 313 compares an SHA-256 digest 451 of the package data stored in the trailer 45 of the encrypted package Cp (see FIG. 6) with an SHA-256 digest recalculated from the range from the package header 41 to the encrypted content file 44 (step 365). If the digests differ, the content-use processing section 313 determines that an error has occurred during storage, transmission, or generation of the data and displays the error (step 370). Alternatively, the content-use processing section 313 may stop the process without displaying the error.

If the digests match in step 365, the content-use processing section 313 compares the SHA-1 digest 421 of the content file stored in the encryption management information 42 of the encrypted package Cp (see FIG. 6) with an SHA-1 digest recalculated from a portion of the content file F in the content package P (step 366). If the digests differ, there is a possibility of falsification, and the content-use processing section 313 displays an error (step 370). Alternatively, the content-use processing section 313 may stop the process without displaying the error.

If the digests match in step 366, the content-use processing section 313 extracts the right-of-use information L from the content package P (step 367). Then, the content-use processing section 313 determines whether permission to a user's processing request is described in the right-of-use information L (step 368).

If it is determined that permission is described in the right-of-use information L, the content-use processing section 313 performs a process of using the content file F (step 369). For example, if the user's process request is a request for export, the AES processing section 314 encrypts the content package P with the apparatus binding key Kpc that the information processing apparatus 30 individually has to derive the apparatus-fixation encrypted package ECp and stores it in the storage device 305. This process is executed on the condition that permission is stored in the permission for export 4234 in the right-of-use information L (see FIG. 6).

If the user's process request is a request for printing, the content-use processing section 313 extracts the content file F from the content package P and gives the content file F to a printing execution program. This process is executed on the condition that permission is stored in the permission for printing 4231 in the right-of-use information L (see FIG. 6).

If the user's process request is a request for printing a display screen, the content-use processing section 313 requests the OS to release a disabled display-screen printing function. This process is executed on the condition that permission is stored in the permission for printing a display screen 4232 in the right-of-use information L (see FIG. 6).

Furthermore, if the user's process request is a request for checking-out, the content-use processing section 313 extracts the content file F from the content package P and writes it into the storage device 305. This process is executed on the condition that permission is stored in the permission for checking-out 4233 in the right-of-use information L (see FIG. 6). This allows the user to obtain access-unrestricted files. This applies not only to the case in which the user's process request is a request for checking-out but also to a case in which the user's process request is a request for copying.

If it is determined that permission is not described in the right-of-use information L, the content-use processing section 313 displays an error (step 370).

Figure 13:
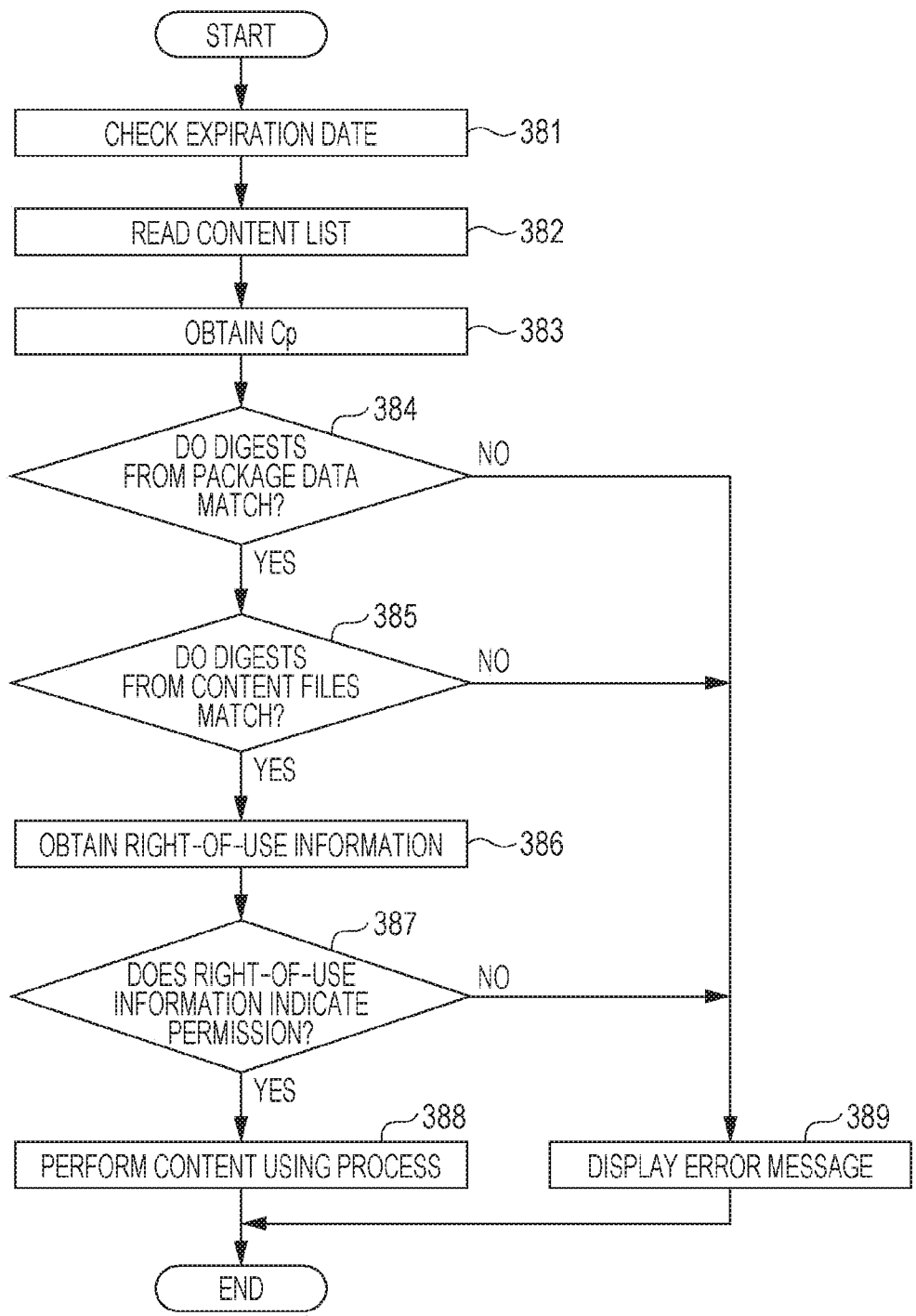
FIG. 13 is a flowchart illustrating an operation for using a content file in the information storage medium performed by the information processing apparatus, in accordance with embodiments of the present invention.

When the content package P is exported to the storage device 305, as described above, the information processing apparatus 30 uses the content file F on the basis of the right-of-use information L. In this case, N apparatus-fixation encrypted packages ECp are stored in the storage device 305. The storage device 305 also holds an apparatus-fixation content list obtained by encrypting the content list containing the name of the content file F and additional information with the apparatus binding key Kpc and apparatus-fixation expiration information obtained by encrypting expiration information with the apparatus binding key Kpc. FIG. 13 is a flowchart illustrating an example of operation therefor performed by the information processing apparatus 30, in accordance with embodiments of the present invention.

In this flowchart, step 381 and step 382 are substantially the same as step 361 and step 362 in FIG. 12. A difference is that a process for decrypting apparatus-fixed data is executed instead of the process for decrypting medium-fixed data. In other words, in this process, the AES processing section 314 decrypts the apparatus-fixation expiration information and the apparatus-fixation content list with the apparatus binding key Kpc.

Step 383 and the subsequent steps 384-389 are substantially the same as step 363 and the subsequent steps 365-370 in FIG. 12, respectively. A difference is that the package key Kc is not used. This is because the process of returning the data exported to the information processing apparatus 30 to the information storage medium 10 and other processes are not performed, and the data is deleted after the expiration date.

Figure 14:
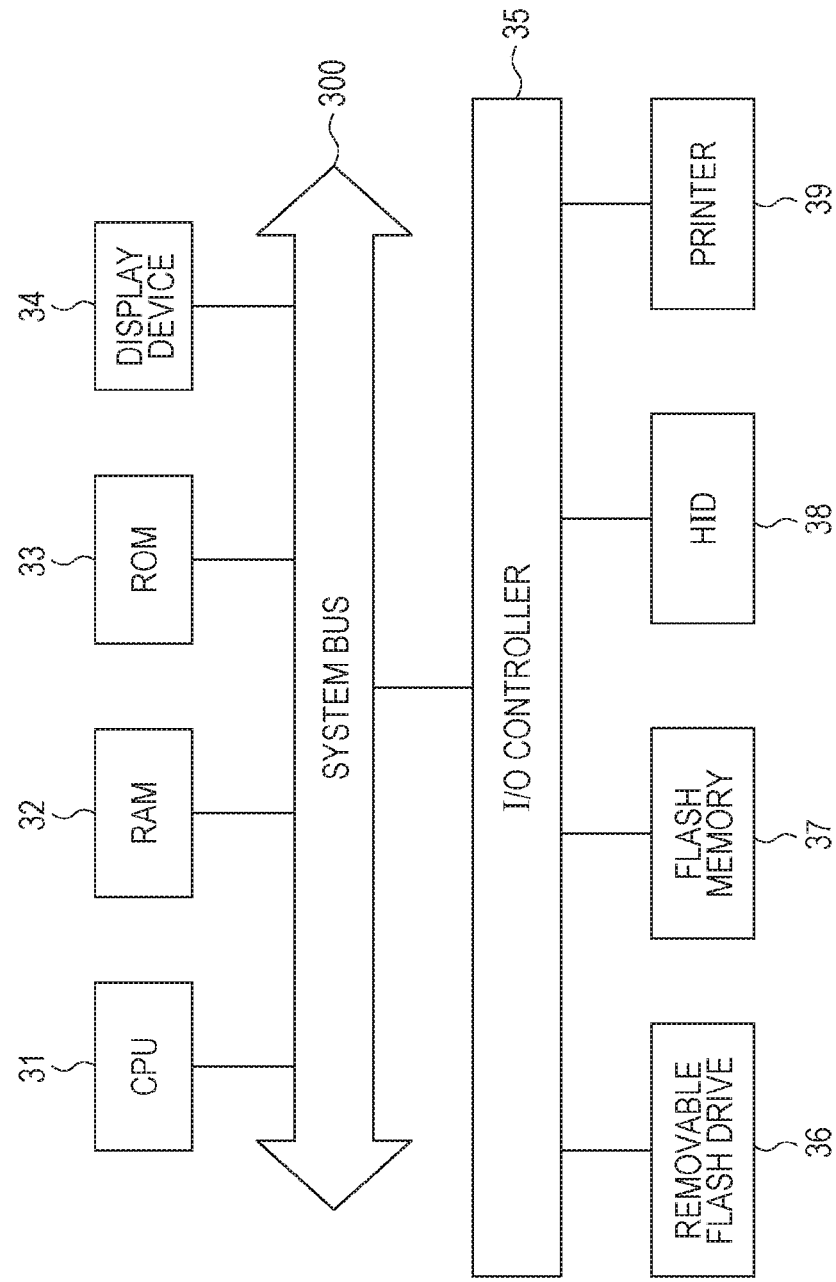
FIG. 14 is a diagram illustrating the hardware configuration of the information processing apparatus, in accordance with embodiments of the present invention.

FIG. 14 is a diagram illustrating an example of the hardware configuration of the information processing apparatus 30, in accordance with embodiments of the present invention. As shown in FIG. 14, the information processing apparatus 30 includes a central processing unit (CPU) 31, a random access memory (RAM) 32, a read only memory (ROM) 33, a display device 34, and an I/O controller 35, which are connected together with a system bus 300. The I/O controller 35 connects to a removable flash drive 36, a flash memory 37, a human interface device (HID) 38, and a printer 39.

The CPU 31 executes a program loaded on the RAM 32 from the removable flash drive 36 or the flash memory 37 or a program on the ROM 33. The program running on the CPU 31 executes an encrypting process and a decrypting process.

The display device 34 is a device for graphically displaying content on a display unit, such as a liquid crystal display, and displays content, such as drawings.

The removable flash drive 36 is an information storage medium, such as a USB memory, which is portable so as to allow replacing of registered data when the construction documents are updated, such as at the maintenance and remodeling of the ship.

The flash memory 37 is used because it is resistant to vibrations of the engine and rolling and pitching due to waves. Of content stored in the information storage medium 10, exportable content is transferred to the flash memory 37 for usage.

The HID 38 is an input device, such as a keyboard and a trackball, which is used by the user to input information to the information processing apparatus 30.

The printer 39 is a printing apparatus for use in printing content, such as diagrams, for usage.

The information writing apparatus 20 has the same hardware configuration as that shown in FIG. 14. The information writing apparatus 20 may further have the function of communicating with a server that archives content.

In this embodiment, the encrypted package Cp including the encrypted content file 44 obtained by encrypting the content file F and the encryption management information 42 obtained by encrypting the management information, such as the right-of-use information L, and the package key Kc necessary for decrypting the encrypted package Cp are stored in the information storage medium 10, such as a flash drive. This allows the user, even at sea, to obtain the encrypted content file 44, the right-of-use information L, and the package key Kc, which is a decryption key for the encrypted content file 44, from the information storage medium 10 without obtaining a license and a decryption key via satellite communications. This offers user convenience and protects the copyright of the content based on the right-of-use information L.

In this embodiment, the encrypted package Cp and the package key Kc can individually be set. Thus, depending on the type of content, for example, only the package key Kc may be downloaded after a license server on the Internet is accessed to obtain authentication, and the encrypted package Cp may be decrypted with the package key Kc. This allows the user ID and a log including the time to remain on the server, thus allowing combined use of various advantageous systems, such as a system that prevents reference by disabling downloading of the package key Kc and a system that limits the time during which the package key Kc can be downloaded.

Furthermore, in this embodiment, the medium-bound encrypted package MCp and the medium-bound package key MKc stored in the protected area Mp of the information storage medium 10 can be encrypted with the encryption key in which the element of the medium binding key Kp0 derived on the basis of the physical attributes of the information storage medium 10 and the identification information on the information storage medium 10 is added. Thus, when the content stored in the information storage medium 10 is copied to another information storage medium, the medium binding keys Kp0 derived from the information storage media differ, so that the content cannot be used. This can prevent the information storage medium 10 from being copied, thus protecting the copyright of the content.

Furthermore, in this embodiment, the information processing apparatus 30 needs the medium key Km given to the each individual information storage medium 10 and the protected area key Kp derived from the medium binding key Kp0 in order to use the medium-bound encrypted package MCp and the medium-bound package key MKc stored in the protected area Mp of the information storage medium 10. This medium key Km cannot be obtained unless it is decrypted with the medium-key decryption key Kd because the medium key Km is stored in the protected area Mp as the medium-bound encrypted medium key MKm that is obtained by encrypting the encrypted medium key CKm, which encrypted with the medium-key encryption key Ke, with the medium binding key Kp0. This disables the information processing apparatus 30 to execute a process of using the content without the medium-key decryption key Kd. The medium-key decryption key Kd is installed to the information processing apparatus 30 using the license code Lc and the license file CKd. This prevents an imitated information processing apparatus 30 from using the information storage medium 10, ensuring protection of the copyright of the content.

Furthermore, in this embodiment, the medium-key decryption key Kd held by the information processing apparatus 30 is encrypted with the apparatus binding key Kpc that is uniquely held by the information processing apparatus 30 and is stored in the storage apparatus 305 of the information processing apparatus 30. Thus, even if a region in which the medium-key decryption key Kd is stored is taken out from the storage device 305 of the information processing apparatus 30 and is transferred to a second information processing apparatus, the apparatus binding keys Kpc derived from these information processing apparatuses differ, so that the second information processing apparatus cannot execute a process of using the content. This ensures protection of the copyright of the content.

Furthermore, in this embodiment, the information processing apparatus 30 executes a process of using the content on the condition that the current date is within the expiration date recorded in the protected area Mp of the information storage medium 10. Thus, even if a person who is not given license improperly obtains the information storage medium 10 and the information processing apparatus 30, the valid period of the content is limited. This can prevent improperly obtained intellectual property from being increased by copying and distributed, in combination with the function for preventing copying of the information storage medium 10, described above.

Furthermore, in this embodiment, content can be exported from the information storage medium 10 to the information processing apparatus 30. This allows the information processing apparatus 30 to execute a process of using the content within the range described in the right-of-use information L. This improves the user convenience.

Furthermore, this embodiment is configured to allow, if permitted by the right-of-use information L, checking-out, copying of the content from the information storage medium 10 to the information processing apparatus 30, printing of the content, and printing of the display screen. This allows the information processing apparatus 30 to execute a process of using the content within the range that the right-of-use information L held in the content package P permits. This improves the user convenience and ensures copyright protection.

Although the use of the serial number S2 stored in the protected area Mp has not been described in detail in this embodiment, expected uses are as follows: the information processing apparatus 30 stores the medium-key decryption key Kd for decrypting the encrypted medium key CKm in association with the serial number S2 serving as the identifier of the information storage medium 10. When the information storage medium 10 is mounted in the information processing apparatus 30, the medium-key decryption key Kd stored in association with the serial number S2 of the information storage medium 10 is used. This allows the content in the plurality of information storage media 10 to be used.

Furthermore, this embodiment is configured to store the expiration information on the information storage medium 10 in the protected area Mp of the information storage medium 10, which cannot be operated from the user interface of a general OS. Thus, means for detecting that the clock of the information processing apparatus 30 is reset to the past time may be provided in the information processing apparatus 30. For example, the reset of the past time may be detected such that the information processing apparatus 30 sequentially holds the time when the content is read from the information storage medium 10 and checks whether the read time has gone back to the time before the preceding read time.

Furthermore, this embodiment may be configured such that the information processing apparatus 30 stores the operation record of a content use program running thereon in the protected area Mp of an information storage medium that cannot be operated with a user interface of a general OS. This allows information security problems to be traced.

Although this embodiment is assumed that the information processing apparatus 30 is installed in an ocean-going ship, this is given for mere illustration and is not intended to limit the present invention. For example, this embodiment can be applied to a case in which the information processing apparatus 30 is an apparatus installed in a high-speed mobile unit that is difficult to satisfy both of the communication band and economic performance and a case in which the information processing apparatus 30 is a portable PC that may be used without power.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described in its embodiments, it is to be understood that the technical scope of the present invention is not limited to these embodiments. It is apparent to those skilled in the art that various changes and modifications can be made without departing from the spirit and scope of the present invention.

What is claimed is:

1. A method for using data including content recorded in a recording medium on a computer apparatus, wherein the data includes a medium-bound package key, a medium-bound encrypted medium key, and a medium-bound encrypted package, the method comprising:
    deriving, using a key deriving section in the computer apparatus, a medium-binding key using medium-attribute information on the recording medium as input to a medium-binding key deriving function, wherein the medium-attribute information uniquely identifies the recording medium;
    obtaining, using an encrypted medium key acquisition section, an encrypted medium key by using the medium-binding key to decrypt the medium-bound encrypted medium key from the recording medium;
    obtaining, using a medium-key acquisition section in the computer apparatus, a medium key by decrypting the encrypted medium key using a private key corresponding to a public key, wherein the private key is transferred to the computer apparatus separately from the recording medium;
    obtaining, using a first data acquisition section in the computer apparatus, a protected area key by using an exclusive-OR operation with the medium-binding key and the medium key;
    obtaining, using a second data acquisition section in the computer apparatus, a common key by decrypting the medium-bound package key from the recording medium using the protected area key;
    obtaining, using the second data acquisition section in the computer apparatus, encrypted content information by decrypting the medium-bound encrypted package from the recording medium using the protected area key; and
    obtaining, using an information acquisition section in the computer apparatus, the information on the content by decrypting the encrypted-content information using the common key.

2. The method of claim 1, wherein the medium attribute information includes the manufacturer name, the product name, the product serial number, and the storage capacity of the information storage medium.

3. The method of claim 2, wherein the medium attribute information is determined at production and cannot be changed afterwards.

4. The method of claim 1, wherein the method is performed without communicating with a server.

5. The method of claim 1, wherein the computer apparatus is not connected to the Internet.

* * * * *